(12) United States Patent
Gevers et al.

(10) Patent No.: US 8,881,881 B2
(45) Date of Patent: Nov. 11, 2014

(54) VISCOUS CLUTCH VALVE ASSEMBLY

(75) Inventors: William Frances Gevers, Simpsonville, SC (US); Derek Savela, St. Paul, MN (US); Scott Miller, Minneapolis, MN (US)

(73) Assignee: Horton, Inc., Roseville, MN (US)

( * ) Notice: Subject to any disclaimer, the term of this patent is extended or adjusted under 35 U.S.C. 154(b) by 0 days.

(21) Appl. No.: 13/809,988

(22) PCT Filed: Aug. 18, 2011

(86) PCT No.: PCT/US2011/048263
§ 371 (c)(1),
(2), (4) Date: Jan. 14, 2013

(87) PCT Pub. No.: WO2012/024497
PCT Pub. Date: Feb. 23, 2012

(65) Prior Publication Data
US 2013/0284556 A1    Oct. 31, 2013

Related U.S. Application Data

(60) Provisional application No. 61/375,173, filed on Aug. 19, 2010.

(51) Int. Cl.
F16D 35/02    (2006.01)
(52) U.S. Cl.
CPC ............ *F16D 35/028* (2013.01); *F16D 35/024* (2013.01)
USPC .................... 192/58.61; 192/58.8; 251/129.2; 251/129.02

(58) Field of Classification Search
CPC .................................. F16D 35/02; F16D 35/24
USPC ............................................. 192/58.8, 58.61
See application file for complete search history.

(56) References Cited

U.S. PATENT DOCUMENTS

| | | |
|---|---|---|
| 2,461,615 A | 2/1949 | Taylor |
| 2,493,811 A | 1/1950 | Graham |

(Continued)

FOREIGN PATENT DOCUMENTS

| | | |
|---|---|---|
| DE | 3823871 A | 1/1990 |
| DE | 19741073 A1 | 3/1999 |

(Continued)

OTHER PUBLICATIONS

International Search Report for PCT Application Serial No. PCT/US2011/048263, dated Mar. 28, 2012, 11 pages.

(Continued)

*Primary Examiner* — Gene Crawford
*Assistant Examiner* — Mark Manley
(74) *Attorney, Agent, or Firm* — Kinney & Lange, P.A.

(57) ABSTRACT

A valve assembly for a viscous clutch includes an orifice plate defining a bore to allow the passage of a fluid through the orifice plate, a reed valve secured relative to the orifice plate, an armature comprising a magnetic flux-conducting material, an anchor spring secured to the armature, and a stiffening plate. The reed valve includes a tongue configured to selectively cover the bore of the orifice plate, and a first pivot location along the tongue. A second pivot location is defined along the anchor spring at an edge of the stiffening plate. The first and second pivot locations are spaced from each other. The armature is configured to selectively apply a force to the reed valve to pivot at least a portion of the tongue about the first pivot location.

28 Claims, 7 Drawing Sheets

(56) References Cited

U.S. PATENT DOCUMENTS

| | | | |
|---|---|---|---|
| 3,210,041 A | 10/1965 | Mitts | |
| 3,800,828 A | 4/1974 | Nelson | |
| 3,876,137 A | 4/1975 | Kelly et al. | |
| 4,170,339 A | 10/1979 | Ueda et al. | |
| 4,246,995 A | 1/1981 | Gee | |
| 4,252,296 A | 2/1981 | Berg | |
| 4,271,945 A | 6/1981 | Budinski | |
| 4,305,491 A | 12/1981 | Rohrer | |
| 4,362,226 A * | 12/1982 | Gee | 192/58.61 |
| 4,556,138 A | 12/1985 | Martin et al. | |
| 4,779,323 A | 10/1988 | Bloemendaal | |
| 4,889,314 A | 12/1989 | Hashizume et al. | |
| 4,987,986 A | 1/1991 | Kennedy et al. | |
| 5,040,567 A * | 8/1991 | Nestler et al. | 137/625.44 |
| 5,042,629 A | 8/1991 | Elmer | |
| 5,152,383 A | 10/1992 | Boyer et al. | |
| 5,161,659 A | 11/1992 | Elmer | |
| 5,191,915 A | 3/1993 | Elmer | |
| 5,280,882 A | 1/1994 | Kamiya et al. | |
| 5,400,823 A | 3/1995 | Elmer | |
| 5,511,643 A | 4/1996 | Brown | |
| 5,722,523 A | 3/1998 | Martin | |
| 5,797,586 A | 8/1998 | Schulte | |
| 5,937,983 A * | 8/1999 | Martin et al. | 192/58.61 |
| 5,992,594 A | 11/1999 | Herrle et al. | |
| 6,026,943 A | 2/2000 | Fuchs et al. | |
| 6,032,775 A | 3/2000 | Martin | |
| 6,173,744 B1 | 1/2001 | Frisch et al. | |
| 6,220,416 B1 * | 4/2001 | Katoh et al. | 192/58.682 |
| 6,239,685 B1 | 5/2001 | Albrecht et al. | |
| 6,386,506 B1 | 5/2002 | Cox | |
| 6,419,064 B1 | 7/2002 | Krammer | |
| 6,443,283 B1 | 9/2002 | Augenstein et al. | |
| 6,484,754 B1 | 11/2002 | Muth et al. | |
| 6,499,509 B2 | 12/2002 | Berger et al. | |
| 6,530,462 B2 | 3/2003 | Lutz | |
| 6,550,596 B2 | 4/2003 | Shiozaki et al. | |
| 6,695,113 B2 | 2/2004 | Lutz | |
| 6,929,019 B2 | 8/2005 | Weinmann et al. | |
| 6,945,276 B2 | 9/2005 | Dörfler et al. | |
| 6,959,911 B2 | 11/2005 | Strasser et al. | |
| 7,017,883 B2 | 3/2006 | Bayer et al. | |
| 7,191,883 B2 | 3/2007 | Angermaier | |
| 7,353,928 B2 | 4/2008 | Yoshioka | |
| 7,828,529 B2 * | 11/2010 | Baumgartner et al. | 417/223 |
| 2002/0003075 A1 | 1/2002 | Shiozaki et al. | |
| 2004/0084273 A1 | 5/2004 | May et al. | |
| 2004/0168877 A1 | 9/2004 | Drager et al. | |
| 2006/0042902 A1 | 3/2006 | Boyer | |
| 2007/0095627 A1 * | 5/2007 | Hagiwara et al. | 192/58.61 |
| 2008/0257677 A1 | 10/2008 | Schultheiss et al. | |
| 2009/0084650 A1 | 4/2009 | Hennessy et al. | |

FOREIGN PATENT DOCUMENTS

| | | |
|---|---|---|
| EP | 1985882 A1 | 10/2008 |
| JP | 59212529 A | 12/1984 |
| JP | 2007113665 A | 5/2007 |
| WO | WO2007/016314 A1 | 2/2007 |

OTHER PUBLICATIONS

Extended European Search Report for EP Application Serial No. 11818782.2, Dated May 19, 2014, 6 pages.

* cited by examiner

VISCOUS CLUTCH VALVE ASSEMBLY

BACKGROUND

The present invention relates generally to valves, and more particularly to electromagnetically actuated valves for use with viscous clutches.

Viscous clutches are used in a wide variety of applications, for example as fan drives in automotive applications. The clutch employs silicone oil for the transmission of torque between two rotating components. It is possible to engage or disengage the clutch by allowing the oil into and out of the working area of the clutch. A valve is used to control the flow of the oil between the input rotor and the output housing. Recent designs have been employed that allow the oil to be stored in the rotating input portion of the clutch while the clutch is disengaged in order to keep the kinetic energy available to allow rapid engagement of the clutch from the off condition. This also allows the clutch to have very low output fan speed while in the off position. It has also become common for the clutch to be controlled electrically (i.e., electromagnetically). This has been done to increase the controllability of the clutch and to also have the clutch capable of responding to multiple cooling needs. Some of the possible cooling needs are coolant temperature, intake air temperature, air conditioning pressure, and oil temperature.

However, tolerances for known viscous clutch valves can be problematic, such as with respect to the flatness of valve components that provide a fluidic seal. For example, known valve assemblies utilizing a single-pivot valve lever that is not sufficiently flat can fail to provide a good seal to prevent viscous fluid from flowing out of a reservoir into the working area. Moreover, known electromagnetically controlled valve assemblies may require a relatively large magnetic field for actuation (i.e., overcoming a default spring biasing force), which can require an undesirably large electromagnetic coil. Large electromagnetic coils tend to be relatively heavy, expensive and power-intensive.

Thus, an alternative viscous clutch and associated valve assembly is desired.

SUMMARY

A valve assembly for a viscous clutch according to an embodiment of the present invention includes an orifice plate defining a bore to allow the passage of a fluid through the orifice plate, a reed valve secured relative to the orifice plate, an armature comprising a magnetic flux-conducting material, an anchor spring secured to the armature, and a stiffening plate. The reed valve includes a tongue configured to selectively cover the bore of the orifice plate, and a first pivot location along the tongue. A second pivot location is defined along the anchor spring at an edge of the stiffening plate. The first and second pivot locations are spaced from each other. The armature is configured to selectively apply a force to the reed valve to pivot at least a portion of the tongue about the first pivot location.

BRIEF DESCRIPTION OF THE DRAWINGS

FIGS. 6A and 6B are perspective views, shown from the side, illustrating operational modeling of valve assemblies subjected to a magnetic field; FIG. 6A illustrates the valve assembly with a stiffening plate omitted, and FIG. 6B illustrates the valve assembly with the stiffening plate included.

While the above-identified drawing figures set forth one or more embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale.

DETAILED DESCRIPTION

In general, the present invention relates to a valve assembly suitable for use with a viscous clutch. For example, the valve assembly of the present invention is suitable for use with a viscous clutch of the type disclosed in PCT Application No. PCT/US2010/056659, filed Nov. 15, 2010, and U.S. Provisional Patent Application Ser. No. 61/261,965, filed Nov. 17, 2009, entitled "Integrated Viscous Clutch," which are each hereby incorporated by reference in their entirety. The present application claims priority to U.S. Provisional Patent Application Ser. No. 61/375,173, Filed Aug. 19, 2010, entitled "Viscous Clutch Valve Assembly," which is hereby incorporated by reference in its entirety.

Figure 1:
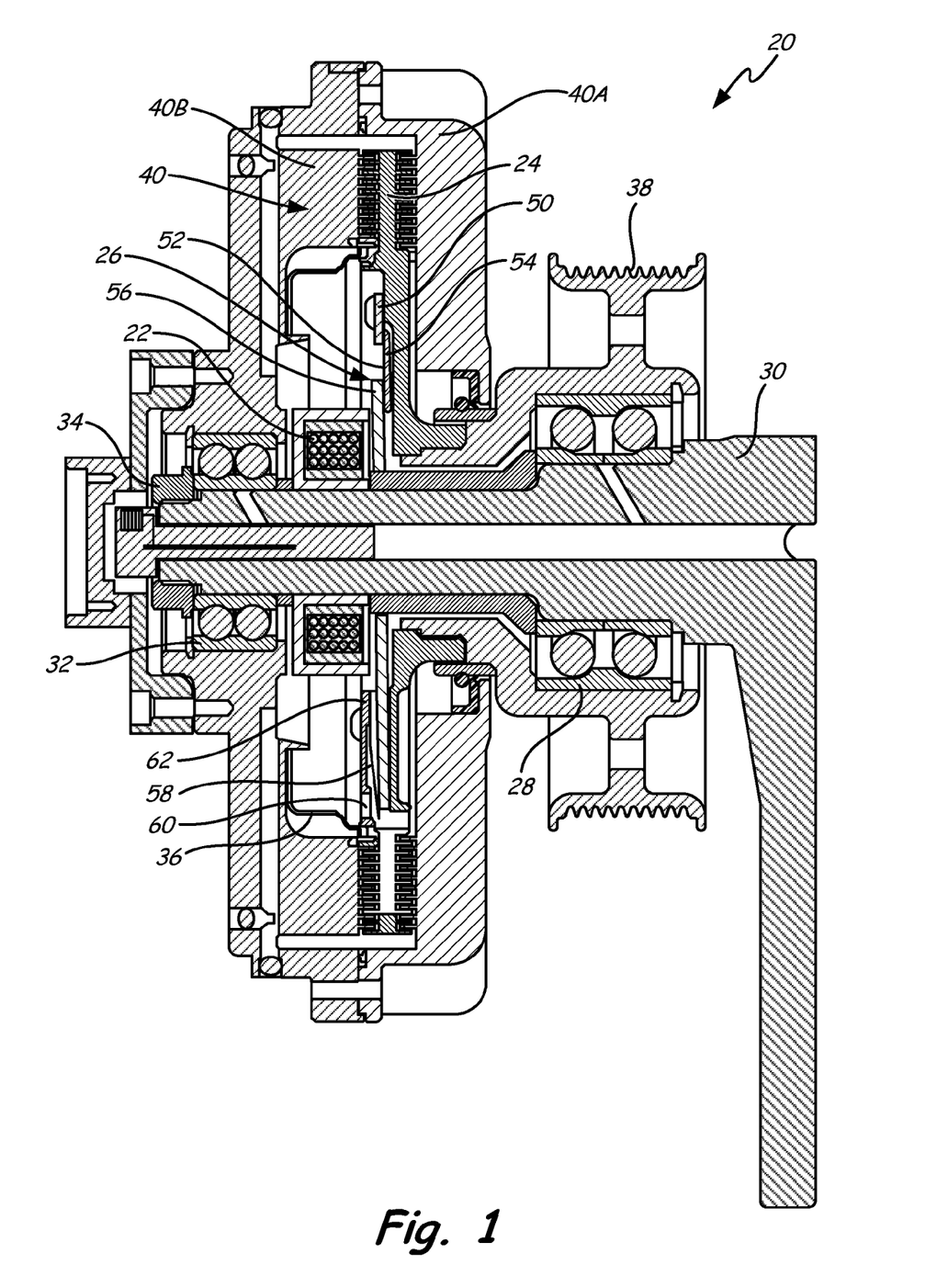
FIG. 1 is a cross-sectional view of a viscous clutch according to the present invention.

FIG. 1 is a cross-sectional view of one embodiment of a viscous clutch 20, which includes an electromagnetic coil assembly 22, a rotor 24, a valve assembly 26, a first bearing set 28, a shaft (or bracket) 30, a second bearing set 32, a retaining member 34, a reservoir 36, an input member 38 (e.g., a sheave), and an output member 40. The input member 38 receives a force input (e.g., torque from a belt), and transmits that power to the rotor 24. The output member 40 adjoins the rotor 24, and a working chamber is defined therebetween. In the illustrated embodiment of FIG. 1, the output member 40 has a multi-part construction, with separate housing 40A and cover 40B portions that are secured to each other and at least partially surround the rotor 24. A fan or other component (not shown) can be engaged to and rotated with the output member 40. The shaft 30 supports components of the clutch relative to a mounting location and can be rotationally fixed. Suitable spacers, sleeves, etc. can be positioned on the shaft 30 as desired, such as to help retain the bearing sets 28 and 32. The shaft 30 allows for mounting the clutch 20 in a desired location, such as in an engine compartment of a motor vehicle (not shown). The shaft 30 can be stationary, that is, non-rotating (though it should be understood that even "stationary" components of the clutch 20 can be installed in a movable vehicle). The retaining member 34 (e.g., a threaded nut) helps secure components supported on the shaft 30. During operation, a viscous fluid (or shear fluid), which can be of a conventional type (e.g., silicone oil), can be selectively introduced to the working chamber to cause a viscous engagement to transmit torque between the rotor 24 and the output member 40. A return path (e.g., suitable passageways through the output member 40) allows the viscous fluid to return to the reservoir 36 from the working chamber in a conventional manner. The reservoir 36 can hold some or all of the shear fluid, and the valve assembly 20 can selectively control the delivery of the shear fluid from the reservoir 36 to the working chamber.

Figure 2A:
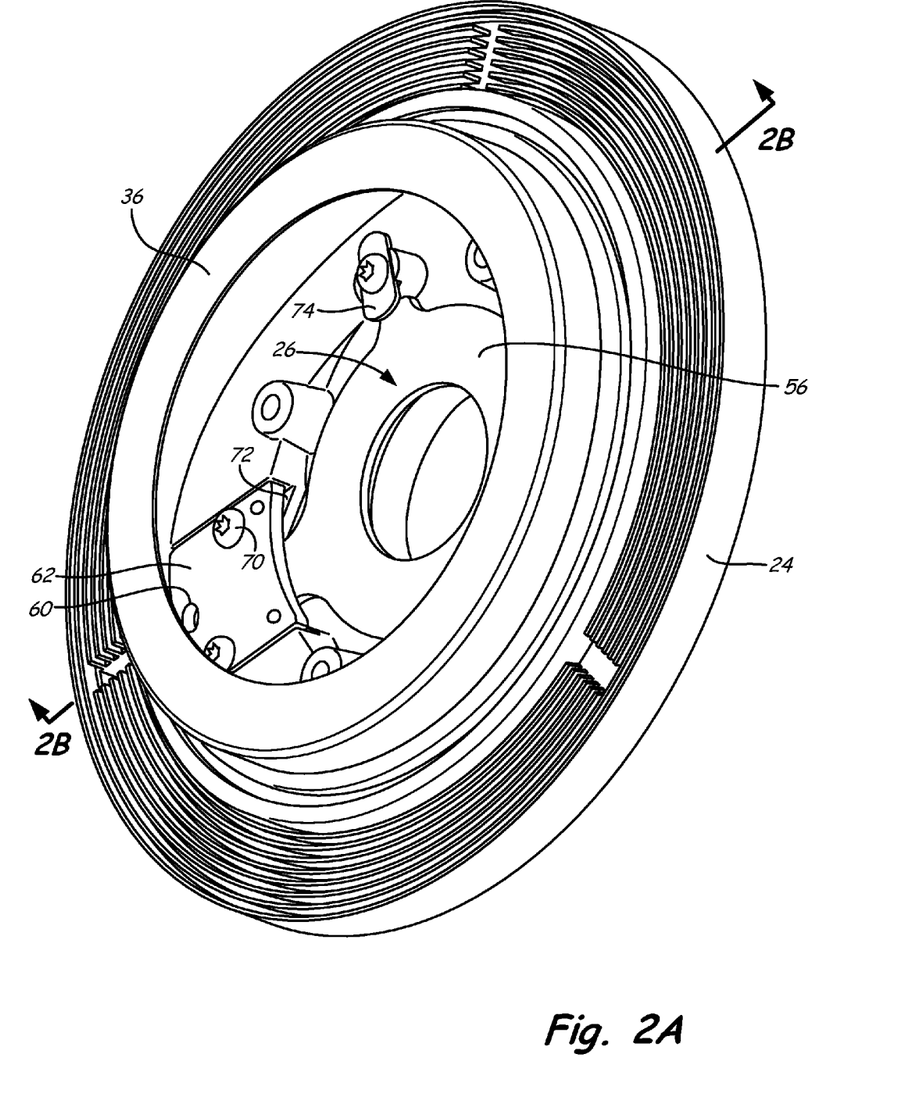
FIG. 2A is a perspective view of a portion of the viscous clutch of FIG. 1, shown in isolation.
Figure 2B:
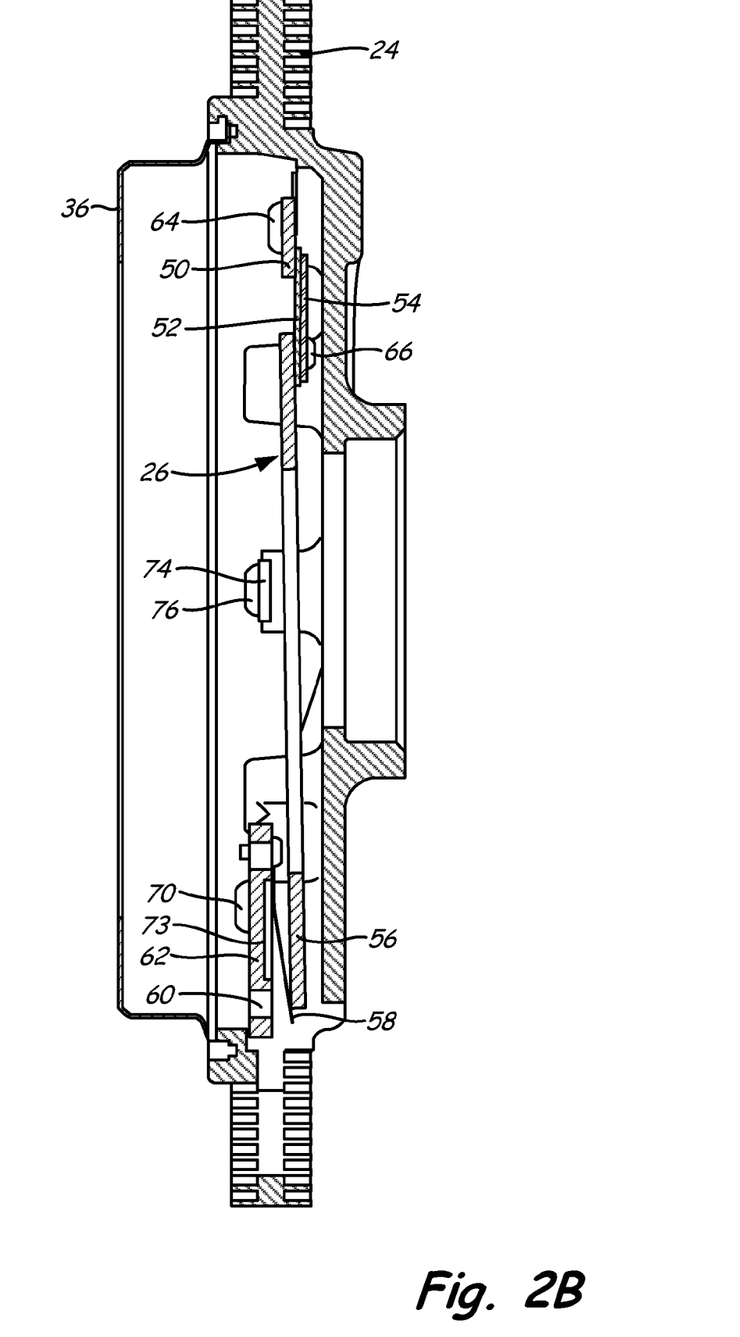
FIG. 2B is a cross-sectional view of the portion of the viscous clutch, taken along line 2B-2B of FIG. 2A.
Figure 3:
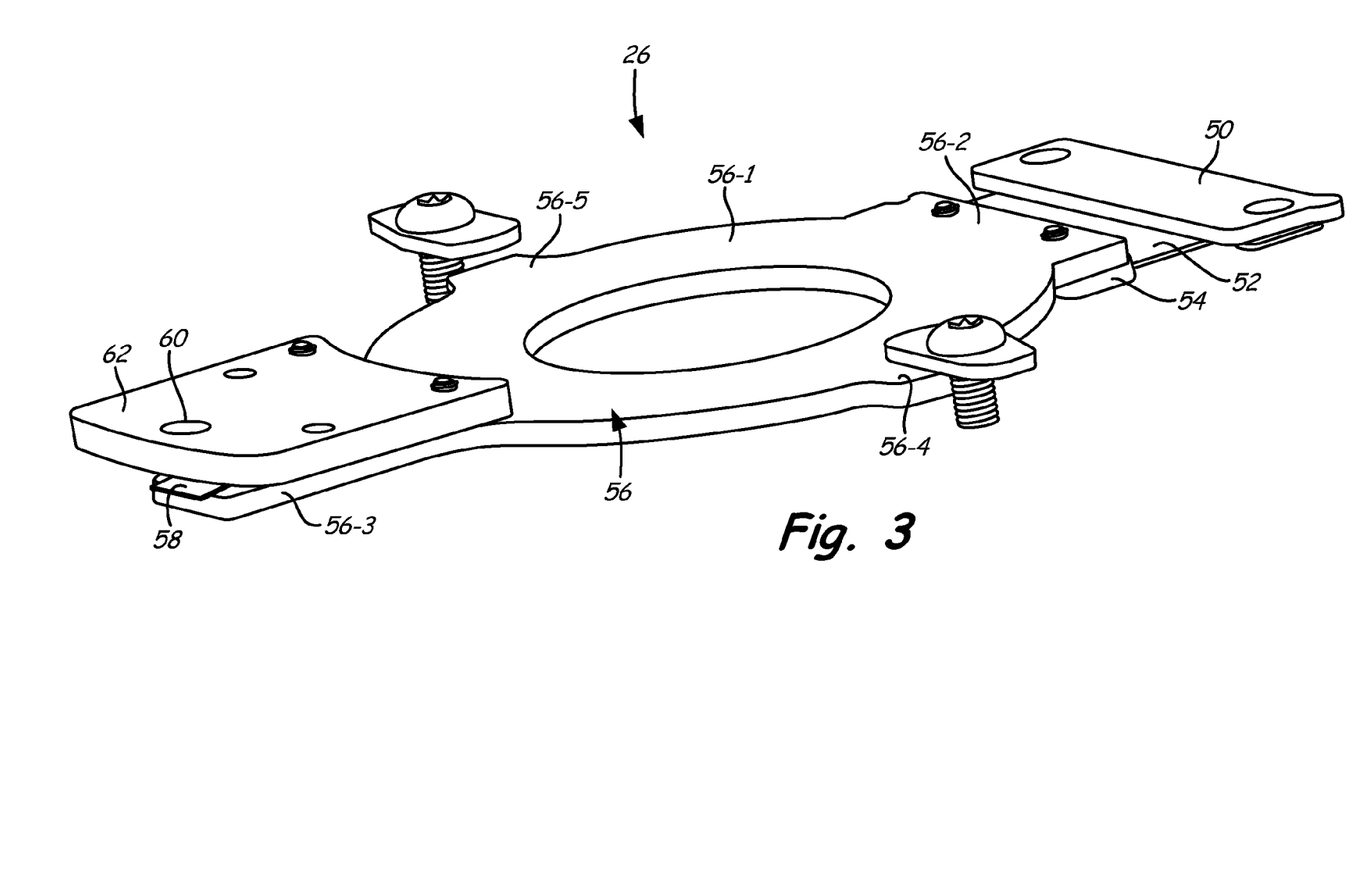
FIG. 3 is a perspective view of a valve assembly of the viscous clutch of FIGS. 1-2B.
Figure 4:
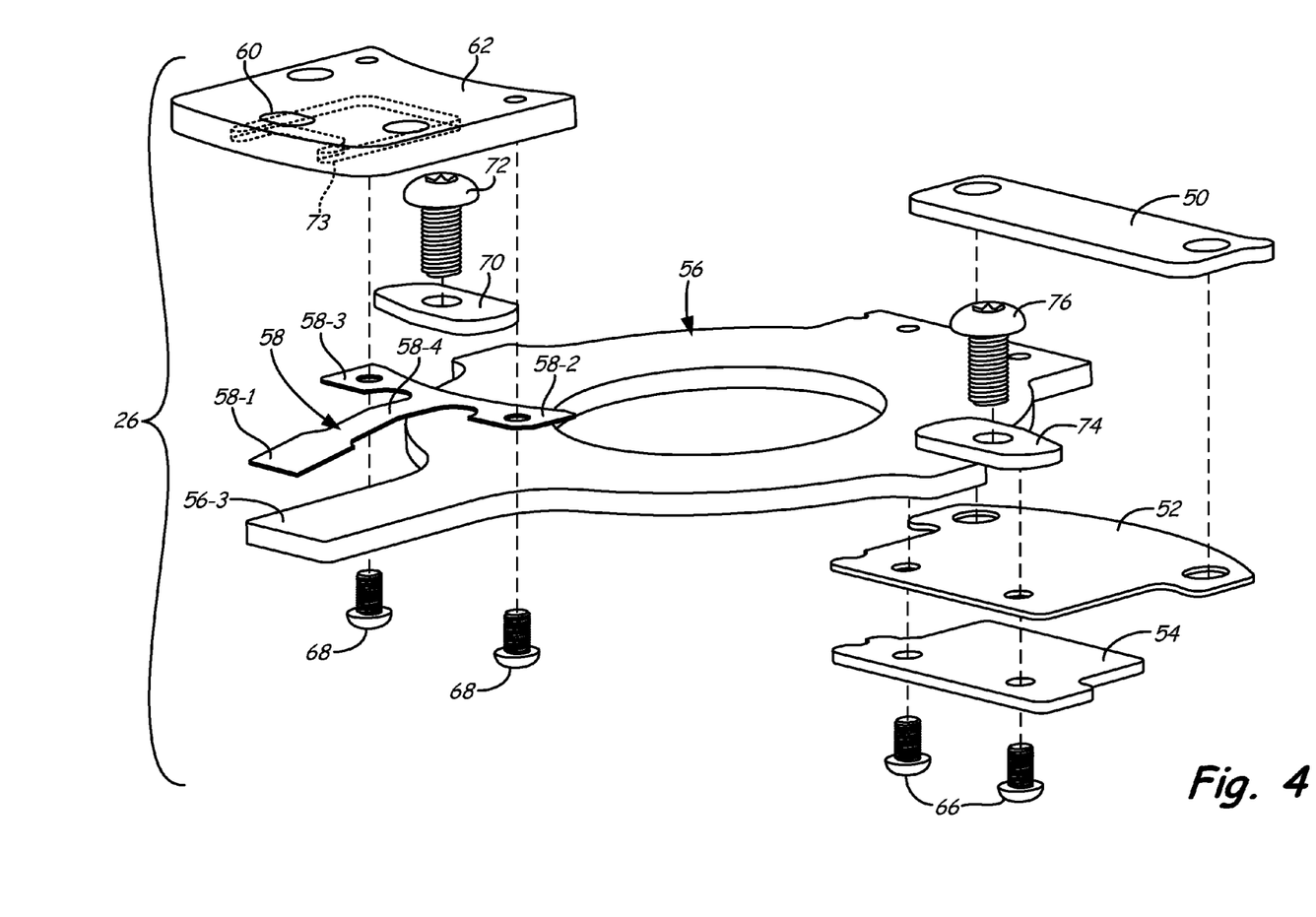
FIG. 4 is an exploded perspective view of the valve assembly of FIG. 3.
Figure 5:
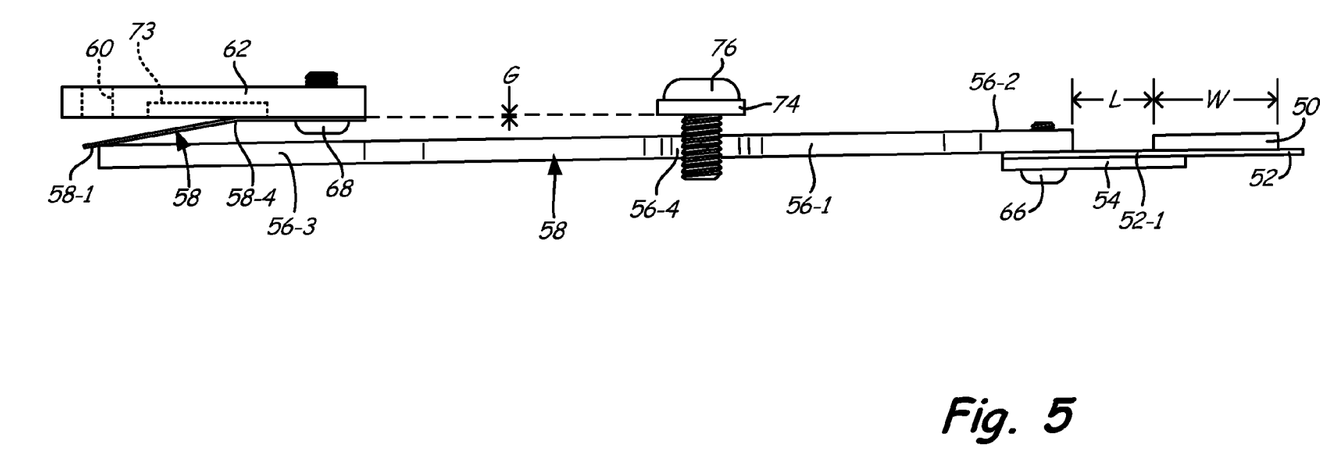
FIG. 5 is a side view of the valve assembly of FIGS. 3 and 4.

FIGS. 2A through 5 illustrate portions of the viscous clutch 20. FIG. 2A is a perspective view of a portion of the viscous clutch 20, FIG. 2B is a cross-sectional view of the portion of the viscous clutch 20, taken along line 2B-2B of FIG. 2A, FIG. 3 is a perspective view of the valve assembly 26, FIG. 4 is an exploded perspective view of the valve assembly 26, and FIG. 5 is a side view of the valve assembly 26.

The valve assembly 26 includes a stiffening plate 50, an anchor spring 52, a back plate 54, an armature 56, and a reed valve 58. The valve assembly 26 controls viscous fluid flow through a bore 60 in an orifice plate 62, which provides a fluid path from the reservoir 36 to the working chamber. Selective energization and de-energization of the electromagnetic coil assembly 22 controls operation of the valve assembly 26, which can be spring biased to a default position when the electromagnetic coil assembly 22 is de-energized and then moved to another position when the electromagnetic coil assembly 22 is energized. In the illustrated embodiment, the valve assembly 26 is spring biased to an "open" position by default, with the bore 60 uncovered to allow viscous fluid to flow from the reservoir 36 to the working chamber.

As shown in the embodiment of FIG. 1, the valve assembly 26 can be positioned generally between the electromagnetic coil assembly 22 and the rotor 24. The valve assembly 26 can be submersed within the reservoir 36 and can be attached to and carried by the rotor 24, which rotates with the input member 38 at an input speed.

The valve assembly 26 includes two independently pivotal (or cantilevered) subassemblies, which helps make the overall valve assembly 26 more resilient to tolerances. The first valve subassembly includes the anchor spring 52 and the armature 56 (the stiffening plate 50 and the back plate 54 can also be considered part of the first valve subassembly). The second valve subassembly includes the reed valve 58. During operation, the armature 56 can be pivoted (e.g., by a magnetic field, spring force, etc.) against and into contact with the reed valve 58, which in turn is pivoted by the force transmitted by the armature 56. The reed valve 58 can then press against the orifice plate 62 to cover and at least partially seal the bore 60 to limit or prevent viscous fluid from passing out of the reservoir 36 through the orifice plate 62. In this way, the armature 56 slides relative to the reed valve 58 during actuation because the armature 56 and the reed valve 58 have respective pivot locations (i.e., fulcrum or bending locations, or hinges) that are spaced apart, as explained further below. The creation of a seal is facilitated if the anchor spring 52 is axially offset from (i.e., located below as shown in FIG. 5) a virtual plane created by a side of the reed valve 58 that faces the armature 56. Flatness tolerances of the armature 56 and for machining of the rotor 24 where the anchor spring 52 and the orifice plate 62 mount can therefore be less restrictive relative to a prior art system having simply a single valve lever directly affixed to and movable with an armature or integrally (monolithically) formed with the armature.

The present invention also provides for control of the spring rate of the valve assembly 26. The anchor spring 52 contributes to the spring rate of the valve assembly 26. The anchor spring 52 connects a stationary (i.e., non-pivoting) rotor-mounted portion of the valve assembly 26 to the dynamic (i.e., pivotal) first valve subassembly. The anchor spring 52 can be sandwiched between (and in contact with) the stiffening plate 50 and the rotor 24 and held there by suitable fasteners 64 (e.g., bolts, screws, rivets), and can also be attached to the armature 56 at an opposite end by suitable fasteners 66 (e.g., bolts, screws, rivets). The anchor spring can be located generally opposite the reed valve 58 in the valve assembly 26. In one embodiment, the anchor spring 52 can be made from spring steel (e.g., ASTM A109-03).

A primary function of the stiffening plate 50 is to help control a spring rate of the valve assembly 26. A pivot location 52-1 of the anchor spring 52 is defined along an armature-facing edge of the stiffening plate 50. Control of the spring rate is accomplished by controlling a gap L between the armature 56 and the stiffening plate 50, which can be easily controlled during the fabrication process by anchoring the valve assembly 26 to the rotor 24 with a calibrated assembly fixture (not shown). In addition, if particular applications require an increase in the spring rate or a decrease of the spring rate, this can be accomplished through suitable variation of a width W of the stiffening plate 50 (which can produce an inversely proportional change in the gap L). In this way, the valve assembly 26 is modular, and can be tailored to particular application by modification of the stiffening plate 50 (and/or the back plate 54) while permitting re-use of some or all of the remaining components of the valve assembly 26. The stiffening plate 50 can be made of a metallic material, and can be configured to be relatively stiff rather than flexible like the anchor spring 52. In the illustrated embodiment, the stiffening plate 50 is substantially thicker than the anchor spring 52 to promote stiffness.

Figure 6A:
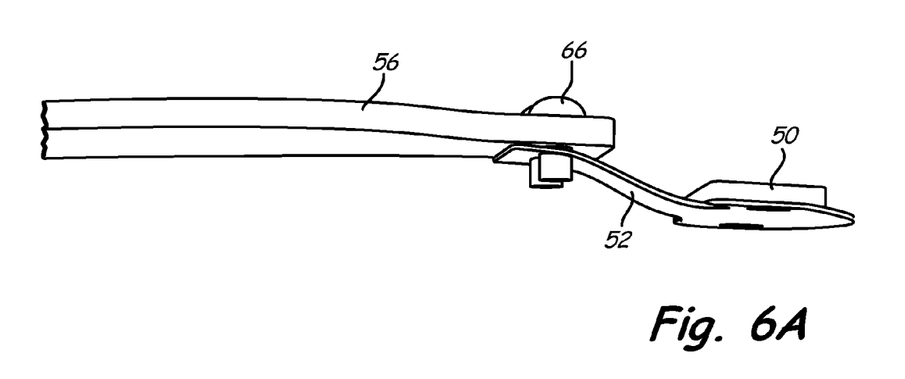
Figure 6B:
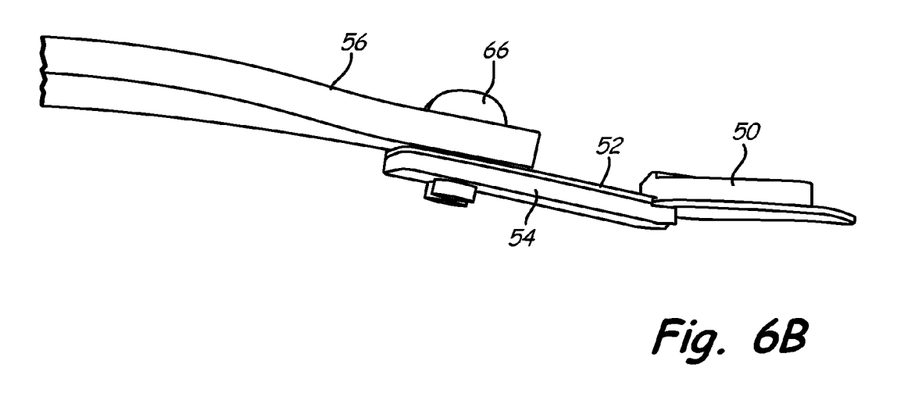

The back plate 54 can provide the following functions: (1) controls the deformed shape of the anchor spring 52, (2) prevents the anchor spring 52 (or portions thereof) from being pulled axially toward the reservoir 36 (in relation to an axis of rotation of the clutch 20), and (3) provides additional torsional rigidity. With regards to item (1) listed above, without the back plate 54, under the influence of magnetic forces the anchor spring 52 would undesirably form an "S" shape, as shown in FIG. 6A. As shown in FIG. 6B, the back plate 54 urges the deformed shape of the anchor spring 52 to take on a cantilever bending shape between the armature 56 and the stiffening plate 50 (i.e., a bending shape that tends to flex in only one direction, like a cantilevered beam loaded at its distal/free end, rather than in multiple directions like an "S" shape). Stated another way, the back plate 54 helps encourage pivotal movement of the armature 56 and helps reduce axial translation of the armature 56 (i.e., in a direction of the axis of rotation of the viscous clutch 20) that can occur in conjunction with complexly shaped bending of the anchor plate 52. In the illustrated embodiment, the back plate 54 is positioned at a first side of the anchor spring 52, opposite the stiffening plate 50. The back plate 54 can extend along the first side of the anchor spring 52 from an edge of the first extension 56-2 of the armature 56 toward the pivot location 52-1. In the illustrated embodiment, the back plate 54 extends past the pivot location 52-1 of the anchor spring 52, such that the back plate 54 and the stiffening plate 50 partially overlap in a generally radial direction (the amount of overlap can vary as desired for particular applications). This configuration of the valve assembly 26 helps limit or prevent the first extension 56-2 of the armature 56 from being pulled in the axial direction and causes an increase in torsional stiffness when the armature 56 is being pulled towards the electromagnetic coil assembly 22. The back plate 54 can be attached to the armature 56 and to the anchor spring 52 at one end and unattached to the anchor spring 52 at an opposite end and still provide the functions identified above. The back plate 54 can be made of a metallic material, and can be configured to be relatively stiff rather than flexible like the anchor spring 52. In the illustrated embodiment, the back plate 54 is substantially thicker than the anchor spring 52 to promote stiffness.

The armature 56 is a movable part that can be activated or moved by a magnetic field created by the electromagnetic coil assembly 22, forming part of a flux path for the magnetic field generated by the coil assembly 22. The armature 56 can be made of a magnetic flux-conducting material capable of actuation by a magnetic field, such as low carbon steel.

During operation, the armature 56 is pulled axially towards the electromagnetic coil assembly 22 by a magnetic field when the electromagnetic coil assembly 22 is energized. The armature 56 aids in the flux transport for magnetic flux from the electromagnetic coil assembly 22 to the armature 56 and from the armature 56 to the shaft 30 (with the flux eventually returning to the coil assembly 22). In addition, the armature 56, when pulled towards the electromagnetic coil assembly 22, presses on the reed valve 58 such that the reed valve 58 covers the bore 60 in the orifice plate 62 to slow or stop the flow of viscous fluid from the reservoir 36 to the working chamber of the viscous clutch 20. In the illustrated embodiment (see, e.g., FIG. 3), the armature 56 includes a generally annular body portion 56-1, a first extension 56-2 that extends from the body portion 56-1 to which the anchor spring 52 and the back plate 54 are secured, and a second extension 56-3 extending from the body portion 56-1 and configured to contact the reed valve 58. A pair of tabs 56-4 and 56-5 can also be provided extending from the body portion 56-1. In the illustrated embodiment, the first and second extensions 56-2 and 56-3 are located approximately 180° from each other, the tabs 56-4 and 56-5 are located approximately 180° from each other, and the first extension 56-2 is located approximately 90° from the tab 56-4. The armature 56 can be a relatively stiff member that does not appreciably flex during operation, that is, does not define a pivot location or hinge, such that the armature can generally maintain a substantially flat, planar shape regardless of applied magnetic fields, operational state or position.

The reed valve 58 is positioned between the rotor 24 and the orifice plate 62. In the illustrated embodiment, the reed valve 58 is generally "T" shaped, with a tongue portion 58-1, and a pair of legs 58-2 and 58-3. In further embodiments, the reed valve 58 can have a three-legged (i.e., "W", "M" or "E") shape. The tongue portion 58-1 can define a pivot location 58-4 at a location spaced in between opposite ends of the tongue portion 58-1. Moreover, a distal end of the cantilevered tongue portion 58-1 can be larger than adjacent areas of the tongue portion 58-1, to facilitate covering and sealing the bore 60. The distal end of the tongue portion 58-1 can pivot about the pivot location 58-4 to cover or uncover the bore 60. The legs 58-2 and 58-3 can be arranged at a proximal end of the tongue portion (i.e., opposite the distal end), and suitable fasteners (e.g., bolts, rivets, screws) can be used to attached the reed valve 58 to the orifice plate 62. In one embodiment, the reed valve 58 can be made from spring steel (e.g., ASTM A109-03). During operation, the reed valve 58 can selectively help provide a seal against the orifice plate 62 when the armature 56 is pulled towards the electromagnetic coil assembly 22. More particularly, the second extension 56-3 of the armature 56 can contact the tongue portion 58-1 of the reed valve 58 when the armature 56 is forced against the reed valve 58 to cover the bore 60 in the orifice plate 62. The reed valve 58 also aids in opening the valve assembly 26 (i.e., uncovering the bore 60 in the orifice plate 62) at a faster rate than a prior art cantilever system while still helping to keep the overall spring constant of the valve assembly 26 to a minimum. The valve assembly 26 of the present invention can provide faster opening (i.e., uncovering of the bore 60), at least in part, because the spring forces of both the reed valve 58 and the anchor spring 52 help urge the armature 56 away from the electromagnetic coil assembly 22, and because the reed valve 58 can bias the second extension 56-3 of the armature 56 at a location spaced from the pivot location 52-1 of the anchor spring 52 thereby gaining a mechanical advantage in biasing torque.

In the illustrated embodiment, the pivot location 58-4 is spaced from the pivot location 52-1, and can those pivot locations can be located at opposite sides of an axis of rotation of the clutch, opposing each other across the shaft 30. The pivot location 58-4 and the pivot location 52-1 are fixed relative to each other in the illustrated embodiment, and the spacing between those components does not vary during clutch operation.

The orifice plate 62 is mounted adjacent to the reed valve 58, and can be attached to the rotor 24 (or other suitable mounting structure). In some embodiments, the legs 58-2 and 58-3 can be sandwiched between portions of the orifice plate 62 and the rotor 24. In the illustrated embodiment, the orifice plate 62 is mounted with suitable fasteners 70 (see FIG. 1) on protrusions of the rotor 24, with a space or groove 72 provided along the rotor 24 to allow for the tongue portion 58-1 of the reed valve 58 to move within an area located in between the orifice plate 62 and the rotor 24. Design of the orifice plate 62 can be modified to vary the size of the bore 60 (i.e., orifice) as desired for particular applications. This configuration increases the modularity of the valve assembly 26, as the bore 60 in the orifice plate 62 can be adapted to particular applications while remaining components of the valve assembly 26 need not be changed.

The orifice plate 62 further includes a depression 73 (see FIGS. 4 and 5) along a rotor-facing surface, which allows at least part of the tongue portion 58-1 of the reed valve 58 to enter. Specifically, part of the tongue portion 58-1 near the pivot location 58-4, at a location spaced in between opposite ends of the tongue portion 58-1, can be aligned with the depression 73. The depression 73 helps promote movement of the reed valve 58, and also helps reduce an area of contact between the tongue portion 58-1 and the orifice plate 62 to help reduce undesirable stiction (i.e., sticking between those components, which can be exacerbated by the presence of viscous fluid).

The orifice plate 62 can also provide a stop surface for the reed valve 58 and the armature 56. During cold ambient conditions the orifice plate 62 can help prevent the armature 56 from contacting electromagnetic coil assembly 22.

The clutch 20 can further include stops 74, with one stop 74 provided adjacent to each of the tabs 56-4 and 56-5 of the armature 56. The stops 74 are configured to limit movement of the tabs 56-4 and 56-5, as well as the remainder of the armature 56, under certain operating conditions. The stops 74 can each be secured to the rotor 24, such as with suitable fasteners 76 (e.g., bolts, screws, rivets). In the illustrated embodiment, a rotor-facing surface of each stop 74 can be offset from (i.e., in a non-co-planar relationship with) a rotor-facing surface of the orifice plate 62 adjacent to the second extension 56-3 of the armature 56 by a gap G, such that the rotor-facing surfaces of the stops 74 are spaced further from the rotor 24 in the axial direction than the rotor-facing surface of the orifice plate 62 adjacent to the second extension 56-3. This configuration allows the stops 74 to limit movement of the armature 56 when at least one of the tabs 56-4 or 56-5 contacts a corresponding stop 74 under high force conditions, such as in cold ambient temperature conditions where the coil assembly 22 tends to operate at relatively high amperage and generates a relatively large magnetic field. Stopping or restricting movement of the armature 56 helps reduce a risk of damage to the reed valve 58 due to excessive movement of the armature 56, while the offset gap G helps reduce a risk that the stops 74 and the tabs 56-4 and 56-5 will interfere with normal valve operation under typical operating conditions.

Those of ordinary skill in the art will recognize that the present invention provides numerous advantages and benefits. For example, the valve assembly of the present invention has a relatively low overall spring rate, which allows for the use of a relatively small electromagnetic coil. A relatively small electromagnetic coil is operable at relative low power levels. Moreover, the valve assembly of the present invention helps to provide relatively high control of flatness tolerances of seating components in order to provide relatively good sealing contact when the valve assembly is positioned to restrict or prevent fluid flow. Further features of the present invention help reduce a risk of damage to the valve assembly under high electromagnetic force conditions, such as commonly present under relatively cold operational temperatures. Additional features and benefits will be apparent to those of ordinary skill in the art in view of the present disclosure of the invention.

Any relative terms or terms of degree used herein, such as "substantially", "approximately", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the spirit and scope of the present disclosure. For example, one or more counterbalancing structures can be added to the valve assembly in further embodiments. The relative shapes and sizes of disclosed components can vary as desired for particular applications. Moreover, the stiffening plate and/or the back plate can be omitted in some embodiments. In addition, features of any disclosed embodiment can be utilized with any other disclosed embodiment as desired for particular applications.

The invention claimed is:

1. A viscous clutch comprising:
    an input member to accept input torque;
    a rotor secured to the input member to rotate therewith;
    an output member located adjacent to the rotor;
    a working chamber defined between the rotor and the output member;
    a reservoir configured to hold a shear fluid;
    a return path defined between the working chamber and the reservoir;
    an electromagnetic coil for selectively generating a magnetic field; and
    a valve assembly configured to selectively control shear fluid flow between the reservoir and the working chamber, the valve assembly comprising:
        an orifice plate defining a bore to allow the passage of the shear fluid through the orifice plate;
        a reed valve secured relative to the orifice plate, the reed valve including:
            a tongue portion configured to selectively cover the bore of the orifice plate; and
            a first pivot location along the tongue portion about which a distal end of the tongue portion can pivot;
        an armature comprising a magnetic flux-conducting material, the armature configured to selectively apply a force to the reed valve as a function of the magnetic field generated by the electromagnetic coil to pivot at least the distal end of the tongue portion about the first pivot location;
        an anchor spring secured to the armature; and
        a stiffening plate, wherein a second pivot location is defined along the anchor spring at an edge of the stiffening plate, and wherein the first and second pivot locations are spaced from each other.

2. The viscous clutch of claim 1, wherein the anchor spring and the orifice plate are secured to the rotor, such that the valve assembly can rotate with the rotor.

3. The viscous clutch of claim 1 and further comprising:
    a stop secured to the rotor and spaced from the orifice plate, wherein the stop is configured to limit travel of the armature toward the electromagnetic coil.

4. The viscous clutch of claim 1, wherein the armature comprises:
    a body portion; and
    an extension from the body portion, wherein the extension is configured to contact the tongue of the reed valve when actuated, and wherein the body portion and the extension are arranged to be substantially co-planar.

5. The viscous clutch of claim 4, where the armature further comprises:
    a tab extending from the body portion approximately 90° from the extension.

6. The viscous clutch of claim 1, the valve assembly further comprising:
    a back plate secured to the anchor spring and extending along the anchor spring from an edge of the armature toward the second pivot location, wherein the back plate is arranged on an opposite side of the anchor spring from the stiffening plate.

7. The viscous clutch of claim 6, wherein the back plate at least partially overlaps the stiffening plate.

8. The viscous clutch of claim 1, wherein the stiffening plate is radially spaced from the armature along the anchor spring by a gap L.

9. The viscous clutch of claim 1 and further comprising:
    a stationary shaft, wherein the output member and the input member are each rotatably supported by the stationary shaft.

10. The viscous clutch of claim 9, wherein the reservoir is secured to the rotor such that the reservoir can rotate with the rotor, and wherein the electromagnetic coil is positioned within the reservoir.

11. A method for operating a viscous clutch, the method comprising:
    generating a magnetic field;
    pivoting an armature about a first pivot location using the magnetic field;
    applying force to a reed valve with the armature while the magnetic field is being generated, wherein the armature presses against the reed valve while force is applied;

pivoting at least a portion of the reed valve about a second pivot location spaced from the first pivot location as a function of the applied force; and covering a bore with the reed valve to limit fluid flow therethrough, wherein in order to cover the bore the reed valve is pivoted toward the bore when force is applied by the armature, and wherein the bore is located in a plate, and wherein a portion of the reed valve at or near the second pivot location enters a depression in the plate when the bore is covered with the reed valve.

12. A method for operating a viscous clutch, the method comprising:

generating a magnetic field;

pivoting an armature about a first pivot location using the magnetic field;

applying force to a reed valve with the armature while the magnetic field is being generated, wherein the armature presses against the reed valve while force is applied;

pivoting at least a portion of the reed valve about a second pivot location spaced from the first pivot location as a function of the applied force;

covering a bore with the reed valve to limit fluid flow there through, wherein in order to cover the bore the reed valve is pivoted toward the bore when force is applied by the armature;

pivoting a back plate about the first pivot location along with the armature; and limiting flexure of an anchor spring attached to the armature with the back plate, wherein the first pivot location is defined by the anchor spring.

13. The method of claim 12 and further comprising:

defining a location of the first pivot location along an anchor spring that is attached to the armature using an edge of a stiffening plate positioned in contact with the anchor spring, wherein the edge of the stiffening plate is spaced from the armature.

14. The method of claim 13 and further comprising:

varying a width of the stiffening plate to adjust a spring rate of the anchor spring.

15. A valve assembly for a viscous clutch, the assembly comprising:

an orifice plate defining a bore to allow the passage of a fluid through the orifice plate;

a reed valve secured relative to the orifice plate, the reed valve including:
a tongue configured to selectively cover the bore of the orifice plate; and
a first pivot location along the tongue;

an armature comprising a magnetic flux-conducting material, the armature configured to selectively apply a force to the reed valve to pivot at least a portion of the tongue about the first pivot location, wherein the armature comprises:
a body portion;
an extension from the body portion, wherein the extension is configured to contact the tongue of the reed valve when actuated, and wherein the body portion and the extension are arranged to be substantially co-planar; and
a tab extending from the body portion approximately 90° from the extension;

an anchor spring secured to the armature and configured to allow selective pivotal movement of the armature in order to selectively apply the force to the reed valve; and a stiffening plate located adjacent to the anchor spring, wherein a second pivot location is defined along the anchor spring at an edge of the stiffening plate, and wherein the first and second pivot locations are spaced from each other.

16. The assembly of claim 15 and further comprising:

a back plate secured to the anchor spring and extending along the anchor spring from an edge of the armature toward the second pivot location, wherein the back plate is arranged on an opposite side of the anchor spring from the stiffening plate.

17. The assembly of claim 16, wherein the back plate at least partially overlaps the stiffening plate.

18. A valve assembly for a viscous clutch, the assembly comprising:

an orifice plate defining a bore to allow the passage of a fluid through the orifice plate;

a reed valve secured relative to the orifice plate, the reed valve including:
a tongue configured to selectively cover the bore of the orifice plate; and
a first pivot location along the tongue;

an armature comprising a magnetic flux-conducting material, the armature configured to selectively apply a force to the reed valve to pivot at least a portion of the tongue about the first pivot location;

an anchor spring secured to the armature and configured to allow selective pivotal movement of the armature in order to selectively apply the force to the reed valve; and a stiffening plate located adjacent to the anchor spring, wherein a second pivot location is defined along the anchor spring at an edge of the stiffening plate, and wherein the first and second pivot locations are spaced from each other, wherein the stiffening plate is radially spaced from the armature along the anchor spring by a gap L.

19. The assembly of claim 15, wherein the orifice plate includes a depression facing the reed valve, and wherein the first pivot location is aligned with the depression.

20. A viscous clutch comprising:

an electromagnetic coil for selectively generating a magnetic field; and a valve assembly configured to selectively control shear fluid flow between a reservoir and a working chamber through a bore as a function of the magnetic field generated by the electromagnetic coil, the valve assembly comprising:
a first valve subassembly comprising:
an armature, wherein the armature is configured to pivot about a first pivot location towards the electromagnetic coil when the magnetic field is generated by the electromagnetic coil;
an anchor spring secured to the armature; and
a stiffening plate, wherein the first pivot location is defined along the anchor spring at an edge of the stiffening plate; and
a second valve subassembly comprising a reed valve, wherein at least a portion of the reed valve is configured to pivot about a second pivot location spaced from the first pivot location, the first valve subassembly configured to selectively apply a force to the second valve subassembly when the magnetic field is generated by the electromagnetic coil such that the reed valve can selectively cover the bore.

21. The viscous clutch of claim 20 and further comprising:
a rotor, wherein the valve assembly is carried by the rotor.

22. The viscous clutch of claim 20 and further comprising:

a rotor, wherein the working chamber is located adjacent to the rotor, and wherein the valve assembly is positioned generally between the electromagnetic coil and the rotor.

23. The method of claim 11 and further comprising:
spring biasing the reed valve to an open position by default, in which the bore is uncovered.

24. The method of claim 23 and further comprising:
spring biasing the armature away from the reed valve by default.

25. The viscous clutch of claim 1 and further comprising:
a stop configured to limit travel of the armature relative to the orifice plate, wherein the stop is offset from the orifice plate by an axial gap.

26. The viscous clutch of claim 1 and further comprising:
a groove in the rotor, wherein the orifice plate is located adjacent to the groove, and wherein at least a portion of the reed valve is positioned between the orifice plate and the rotor within the groove.

27. The viscous clutch of claim 26, wherein the groove is open to the reservoir away from the bore in the orifice plate, in order for at least a portion of the armature to enter the groove.

28. A valve assembly for a viscous clutch, the assembly comprising:
an orifice plate defining a bore to allow the passage of a fluid through the orifice plate;
a reed valve secured relative to the orifice plate, the reed valve including:
a tongue configured to selectively cover the bore of the orifice plate; and
a first pivot location along the tongue;
an armature comprising a magnetic flux-conducting material, the armature configured to selectively apply a force to the reed valve to pivot at least a portion of the tongue about the first pivot location;
an anchor spring secured to the armature and configured to allow selective pivotal movement of the armature in order to selectively apply the force to the reed valve, wherein the armature is located to one side of the orifice plate in all pivotal positions; and
a stiffening plate located adjacent to the anchor spring, wherein a second pivot location is defined along the anchor spring at an edge of the stiffening plate, and wherein the first and second pivot locations are spaced from each other.

\* \* \* \* \*